Jan. 13, 1970 W. F. MATHEWSON 3,489,282
PULP SCREEN
Filed Oct. 12, 1967 3 Sheets-Sheet 1
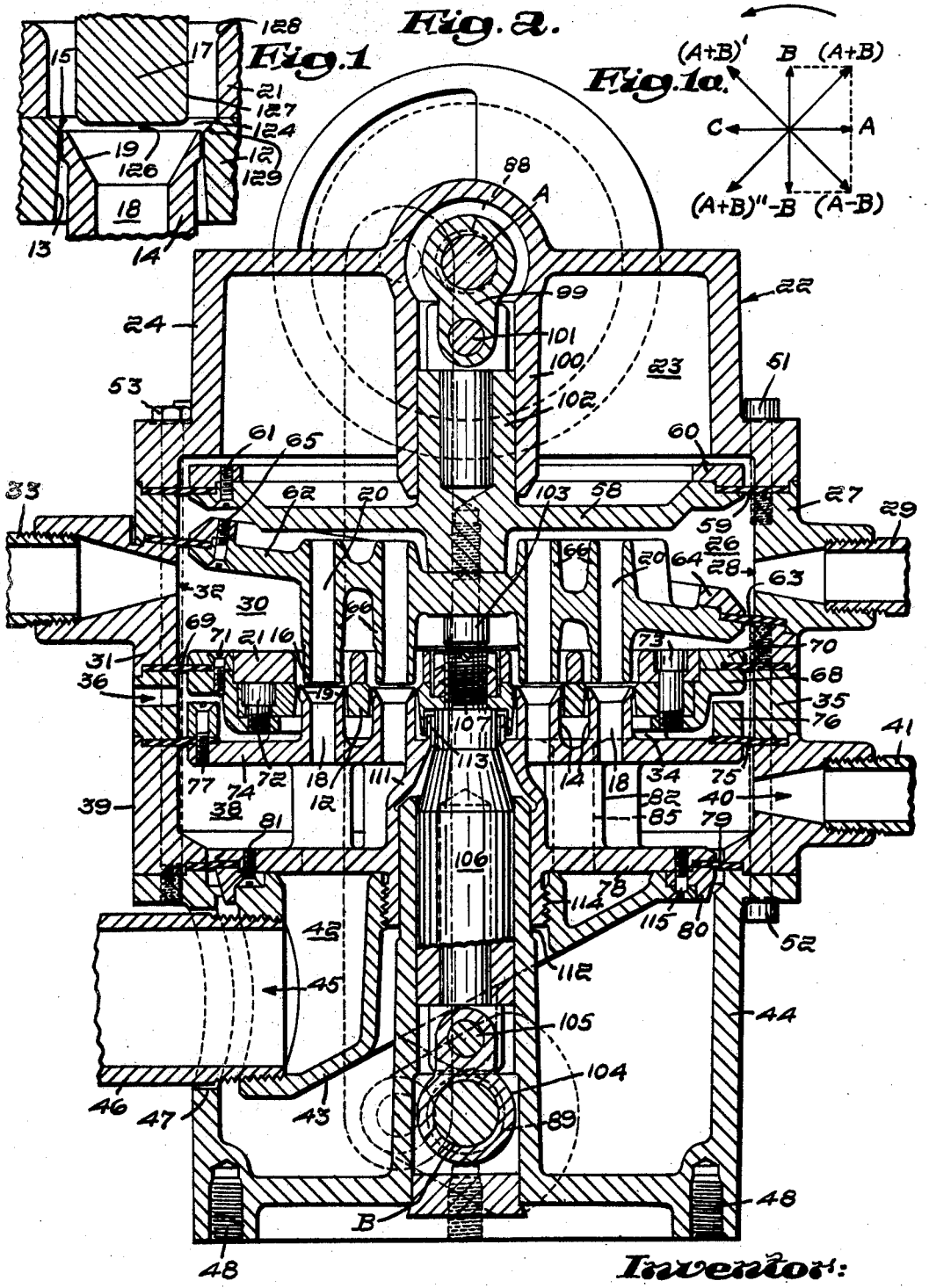
Inventor:
Wilfred F. Mathewson,
by Russell, Chittick & Pfund
Attorneys

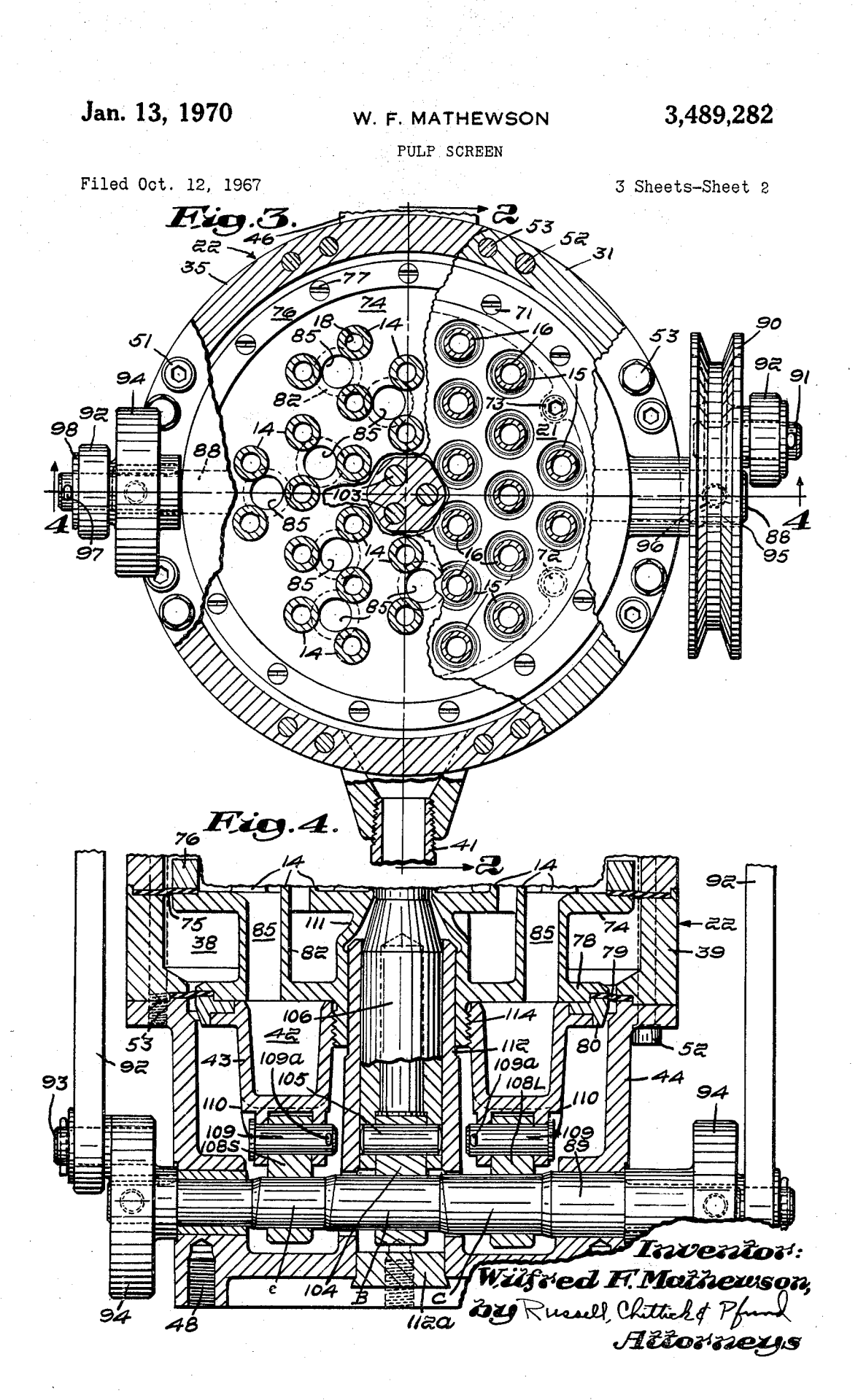

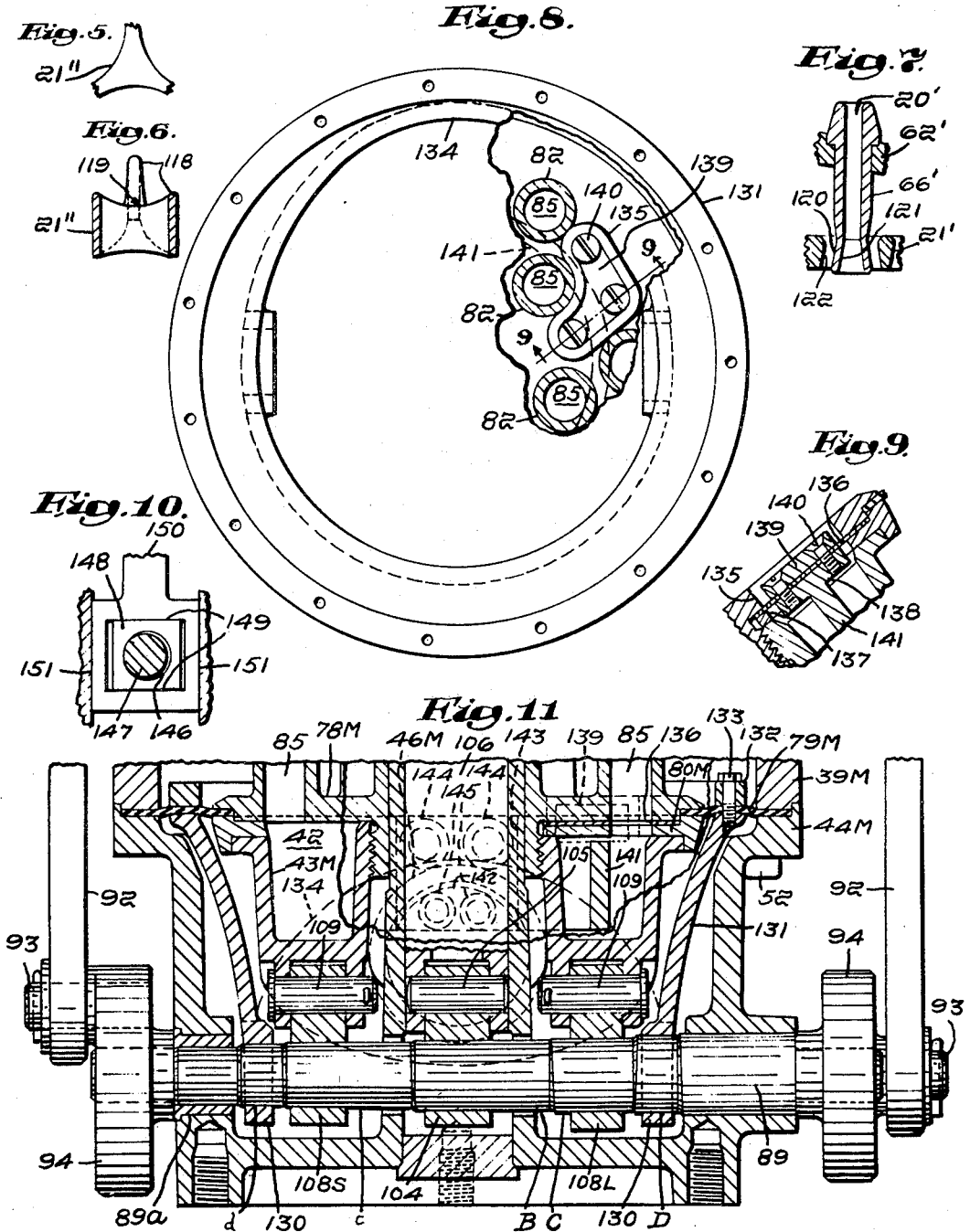

United States Patent Office 3,489,282
Patented Jan. 13, 1970

3,489,282
PULP SCREEN
Wilfred F. Mathewson, 21 Morrell St.,
North Weymouth, Mass. 02191
Filed Oct. 12, 1967, Ser. No. 674,857
Int. Cl. B07b 1/00
U.S. Cl. 209—264                              21 Claims

ABSTRACT OF THE DISCLOSURE

A pulp screen design is provided in which the screening apertures are formed as annular spaces between the walls of holes in a screening aperture matrix and core elements positioned concentrically in the holes. Relative axial motion of the core in the hole and control of the flow pressure including reverse and separate flushing flows by means of volumetric change in the fluid chambers provides periodic cleaning of the apertures by stripping the screen retained fibers from the edges of the hole and core elements. Fluid inertial forces are used to advantage in generating or neutralizing some pressures.

CROSS REFERENCE TO RELATED APPLICATIONS

This patent application relates to U.S. patent application No. 302,304, filed Aug. 15, 1963, presently abandoned in favor of the present application and to applicant's U.S. Patent No. 3,276,584, issued Oct. 4, 1966 and applicant's earlier U.S. patents listed therein.

BACKGROUND OF THE INVENTION

Field of the invention

The field of this invention is pulp screening. The difficulties peculiar to the screening of pulp according to fiber diameters while in fluid suspension arise from several circumstances including: the nature of the fiber presentation to the screen when the fiber length may be a hundred times the apparent fiber diameter; in the case of the common cellulose fiber in aqueous suspension, the adhesive nature of the fiber when drawn over the screening edge; the tendency of fibers generally to be retained on a fiber initially retained at a screening edge, predicating prompt screen stripping; and fibrous protrusions from screen retained material extending into the screening slot.

Description of the prior art

Vertically oscillating, substantially horizontally mounted, straight slotted pulp screen plates are common in the industry. In the present invention the screening slot is circular or annular in shape and therefore free from the slot ends occurring with the slots of substantially straight extension. Pulp screening slot ends are objectionable as accentuating the problem of oblique fiber entry into the screening slot as the diverse direction of suspended fiber approach may result in more rapid retained fiber build-up. The only circular screening slot showings other than the present of which applicant is aware is in applicant's U.S. Patent No. 2,574,977 and the Haug U.S. Patent No. 1,185,794, both variant from the present construction where the screen orifices occur multiply in a flat plane. Both of these Patents No. 2,574, 977 and No. 1,185,794 together with the Sargent U.S. No. 3,255,884 patent show one screening edge in relative motion, in the direction of the screening slot extension, when the screen is operational; this construction may result in fibers being rolled together, in their screen passage, which would be highly objectionable as separation would be quite uncertain in later pulp handling. Pulp fine screens other than applicant's are generally objectionable in that the screen retained material is returned to the raw stock as the raw stock travels over the screening face so that, after repeated screenwise presentations, the raw stock becomes the reject stock. This multiple screen presentation is thus inefficient.

SUMMARY

This invention relates to a generally enclosed device for the removal of oversize material from fibrous pulp in fluid suspension including in combination, a screening aperture matrix with holes and separately supported core elements placed in said holes in said screening aperture matrix whereby a continuous screening aperture is formed between the periphery of any said core element at its screen side termination and the wall of said hole in said screening aperture matrix. This basic annular screening aperture may be selectively operated with a variety of options including means for oscillating the screening aperture matrix, means for introducing screen entry flow pulsing either by fluid inertia forces or by cyclical raw stock chamber compression, means for oscillating the core elements as mounted on a common core element support plate in a direction substantially perpendicular to the directions of the screening aperture matrix extension or whereby the width of a screening aperture will remain substantially uniform, a continuous prescreening raw stock flow passageway immediately in advance of each continuous screening aperture and matched thereto, formed on one side by the periphery of a flow director element in spaced relationship from the core element at its screen side termination and on the other side optionally by a wall cooperating with the flow director for this fluid directing purpose, the spaced relationship of core element and flow director furthermore providing a removal passageway for flushed screen retained material. The passageways internal of each core element or each flow director, or both, provide for the further removal of flushed screen retained material. Added means may provide compensation for the cyclical volume change in each zone of the spaced relationship of core element and flow director as induced by their relative oscillatory motion and through tubes traversing a flushing flow chamber are provided for transferring the screened pulp therebeyond for removal from the casing.

The principal object of the present invention is to provide an improved pulp screen employing an annular aperture which utilizes the foregoing features to achieve highly efficient screening of pulp stock.

BRIEF DESCRIPTION OF THE DRAWINGS

FIG. 1 is a diametral cross section of an annular screening slot, immediately adjacent flow passages and wall structures therefor.

FIG. 1a is a vector diagram of the relative timing of the oscillation generating eccentric throws.

FIG. 2 is a section on the line 2—2 of FIG. 3.

FIG. 3 is a top plan view of an enclosed pulp screen assembly with portions broken out in sections, at a level immediately above the individual prescreening flow passageways, at a section generally immediately below the screening aperture matrix and its mounting ring and centrally at a section through a hub protrusion from the raw stock chamber closure plate.

FIG. 4 is a section on the line 4—4 of FIG. 3 of the portion of the pulp screen assembly below the screening aperture matrix and its frame.

FIG. 5 is a view of a portion of a prescreening flow guide plate as occurring between the walls of three closely adjacent prescreening flow guide holes in an alternate design.

FIG. 6 is an isometric view of the prescreening flow guide portion of FIG. 5.

FIG. 7 is a diametral cross sectional view of a second alternate design of a prescreening flow guide portion and enclosed flushing flow tube and support therefor.

FIG. 8 is a view of an optionally additive ring diaphragm element. Enclosed within FIG. 8 is a section through screen passed stock transfer tubes showing the typical individual diaphragm of FIG. 9 in an aperture provided therefor in the compensatory diaphragm closure plate.

FIG. 9 is a section on the line 9—9 of the enclosure within FIG. 8 showing a typical individual diaphragm of a further alternate diaphragm design.

FIG. 10 shows a Scotch yoke of eccentric follower for comparative purposes.

FIG. 11 is an adaptation of FIG. 4, modified to include the optionally additive ring diaphragm of FIG. 8 with the appurtenances and eccentric drive therefor, and, in a portion broken out, a representation of the individual diaphragm of FIG. 9 in place with the mounting means therefor.

DESCRIPTION OF THE PREFERRED EMBODIMENT

Each screening aperture consists of a ring or annular passage between a screening aperture matrix hole and a core element centrally disposed therein. FIG. 1 is an enlarged section taken through the axis of such a ring aperture illustrating this and some other features of the novel screening action. The screening aperture matrix is shown at 12, the wall of a hole therein at 13, and the core element at 14. Near the termination of the core element 14 it is suitably, as uniformly as possible, spaced from the screening aperture matrix hole wall 13 to form an annular screening aperture indicated at 15. For reasons of machining and drawing convenience the apertures are taken to be true circular; a deformation of the screening aperture towards a hexagonal shape may offer some advantage in screening practice at the expense of a somewhat more expensive construction. In the view of FIG. 1 the screen transmitted fraction is delivered downward; a widening of the annular passage below the aperture provides for freer delivery.

The core element 14 is preferably supported independently of the screening aperture matrix 12 so that an oscillatory motion of the core element may be imparted in the direction of its axis relative to the screening aperture matrix to assist in the freeing of the screen retained material which may have hairlike protrusions extending into the screening orifice. The flushed screen retained material (the "rejects") is withdrawn from the screening aperture entrance by flow towards the axis of the annular screening passage.

To define a proper passageway for the removal of the screen retained or reject material and to prevent a direct admission of the bulk of the raw stock, an individual flow director as at 17, is provided for each screening aperture. With the solid flow director 17, the rejects removal takes place through a central passageway 18 in the core element 14 that is outwardly flared near the core element screen side termination at 19.

From other considerations set forth herein it is deemed desirable to provide for flushing flow admission into the screen unit casing for rejects flushing with separated individual flushing flow circuits established to receive and disperse with itself the flushed screen retained material at each screening orifice so that the material thus combined, rather than the raw stock flushed screen retained material alone will be conducted from the casing. To complete the flushing flow circuit, in the instance of each screening position, FIG. 2 shows each individual flow director 16 provided with a central passageway 20 cooperative with the central passageway 18 in the core element 14 occurring at the same screening position.

For other purposes as set forth herein a raw stock flow director plate 21 may be provided for guidance of the flow towards the screening aperture through a channel.

The balance of the detailed description generally relates to providing such proper facilities for various screening positions as means for the distribution or collection of the various flows, means for obtaining the desired oscillatory motion of the core elements and means for obtaining a suitable cyclical screening pressure reduction to provide for a cyclical stripping of the screen retained material. Occasionally fuller descriptions of some of the functions is postponed for later consideration in connection with theoretical aspects.

It is desirable to include a substantial number of screening orifices in a single enclosed screening unit as shown in FIG. 2; it is also desirable that the number of external piping connections be held to a minimum. In view of these considerations, proper flow distribution or collection means for the various flows becomes an important element of the design.

For the purposes of this invention two oscillatory motions are used, one to pulse by diaphragm the raw stock so that the screen entry flow may be cyclically reduced, ceased or even reversed during the stripping of the screen retained material, and one to oscillate the core elements within the screening aperture matrix holes, to assist in freeing screen retained material from which hairlike protrusions may extend into the screening orifice. As a practical matter, to avoid the complicated sealing separately of each individual screening aperture, some of the ducts of the flow distribution and collection systems may incidentally be oscillable also, so that under desirable operating conditions various pressures may result due to the inertia of the various fluids. These matters will be described in further detail later herein.

The screen unit casing 22 is generally cylindrical in nature and is divided internally into a series of chambers. Considered in the general direction of the flow of the screen slots transmitted fraction, from top to bottom in FIGS. 2 and 4, the chambers, their adjacent portions of cylindrical casing wall extension, and the fluid connections to the chamber through the casing wall are:

a chamber 23 within the corresponding casing end member 24;

a first flushing flow chamber 26 confined at the casing wall by the casing cylindrical wall portion 27 except that a port 28 is provided for connection to external flushing flow conduit or pipe 29;

a raw or unscreened stock chamber as at 30 confined at the casing wall by a casing cylindrical wall portion 31 except for a port 32 provided for connection to raw stock supply conduit or piping 33;

a first accepted stock chamber 34, confined at the casing wall by the casing cylindrical wall portion 35 except for a vent 36 open to the atmosphere;

a second flushing flow chamber 38 confined at the casing wall by the casing cylindrical wall portion 39 except for a port 40 provided for connection to external flushing flow conduit or piping 41;

a second screened or "accepted" stock chamber 42 in an oscillating pod or trough 43, located within the casing end member 44 and side ported at 45 into accept stock delivery pipe 46 extending through an aperture 47, in the casing end member 44, sufficiently large to permit the pipe 46 to oscillate operationally.

Otherwise in the casing end member 44, tapped holes as at 48 are provided for mounting the screen unit when it is to be operated in the spatial orientation indicated in the drawings.

All of the internal partition walls separating the various chambers generally consist of an oscillating diaphragm center of rigid material sealed beyond its outside diameter by a flexible rim ring diaphragm clamped to the diaphragm center and extending outwardly therefrom through a free flexing zone to the casing inside diameter and therebeyond into a snug seating between the two casing elements that, outwardly from the diaphragm seat and a short cylindrical piloting fit square therewith, abut one another directly.

Similar piloting fits may also be provided between each oscillating diaphragm center and its flexible rim ring diaphragm clamp ring, as indicated on the drawings. It is to be understood that the internal partition walls as described may be pierced with the apertures requisite to the proper screen operation as will be later described herein. It is also to be understood that all joints may be dowelled to permit accurate realignment upon reassembly, according to good manufacturing procedures.

It is desirable that the casing may be readily opened up to expose the screening orifices, for inspection and cleaning, and it is further desirable that it may also be readily and accurately reassembled. For this purpose it will be apparent that some of the casing external mechanical driving facilities and some of the attached piping, as at closely adjacent pipe unions or flanges, must be disconnected. In opening the screen casing for present purposes it is desirable that the minimal two major portions that must be separated be in themselves kept quite intact to preserve the alignment of the interior parts and save refitting of flexible diaphragm elements. In the furtherance of this objective, in FIGS. 2, 3 and 4, the version there depicted is shown with the two top casing elements bound together with screws as at 51 while the screws as at 52 retain the four lower casing elements together. The screws 53 serve to bind the two casing end members and intervening casing cylindrical wall portions together when the screen unit of that version is to be rendered operational.

The oscillating diaphragms separating the interial chambers will now be described in the order of their appearance in the general direction of the screen transmitted flow, from top to bottom in the drawing representations of FIGS. 2 and 4.

The first flushing flow chamber 26 has a first flushing flow chamber closure plate 58 with a flexible rim sealing diaphragm 59, a clamp ring 60 and clamp screws 61 for clamping the flexible diaphragm 59 to the plate 58. Outwardly beyond its free flexing zone, the flexible diaphragm 59 extends into a clamped seating between the casing end member 24 flange and the casing cylindrical wall portion 27.

The first flushing flow chamber 26 is separated from the raw stock chamber 30 by a flow control plate 62, its flexible rim sealing diaphragm 63, a clamp ring 64 and clamp screws 65 for clamping the flexible diaphragm 63 to the plate 62. The flow control plate 62 carries flushing flow tubes 66, one for each screening position, on which at their screen side termination are the flow directors 16; the flow control plate 62 thus serves as a common support plate for the individual flow directors 16. The flushing flow tubes 66 generally are equal in overall length and equal in their central passageway 20 diameter to balance out their flushing flow resistance; minor adjustments in these dimensions may however, be made to balance out inequalities in flow resistance to or from the flushing flow chamber port 28. Outwardly beyond its free flexing zone the flexible diaphragm 63 extends into a clamped seating between the casing cylindrical wall portions 27 and 31.

The screening aperture matrix 12 marks the separation of the raw stock chamber 30 and the first accept stock chamber 34. The screening aperture matrix is mounted in a frame 68 which is sealed by a rim sealing flexible diaphragm 69. A clamp ring 70 and clamp screws 71 clamp the flexible diaphragm 69 to the screening aperture matrix frame 68. Outwardly beyond its free flexing zone the flexible diaphragm 69 extends to a clamped seating between the casing cylindrical wall portions 31 and 35. The screening aperture matrix 12 is retained to its seat by screws 72; the superimposed flow director plate 21 is retained by screws 73.

Separating the first accept stock chamber 34 from the second flushing flow chamber 38 is an oscillable core element support plate 74, its flexible rim sealing diaphragm 75, a clamp ring 76 and clamp screws 77 for clamping the flexible diaphragm 75 to the core element support plate 74. Outwardly beyond its free flexing zone the flexible diaphragm 75 extends into a clamped seating between the casing cylindrical wall portions 35 and 39.

The second flushing flow chamber 38 is closed at the bottom by a second flushing flow chamber closing and cyclical volume compensatory plate 78, its flexible rim sealing diaphragm 79, a clamp ring 80 and clamping screws 81. Outwardly beyond its free flexing zone, the flexible diaphragm 79 extends into a clamped seating between the casing cylindrical wall portion 39 and the casing end member 44 at its flange.

It is a feature of this invention that the screen transmitted pulp fractions as received in the first accept stock chamber 34 may exit therefrom through tubes 82 traversing through the second flushing flow chamber 38; the nature of this flow arrangement is best seen in FIG. 4. While alternatively the accept stock might be removed directly from the casing radially from the first accepted stock chamber as by altering the position and size and numbers of the present air vents, the present design is preferred, primarily as permitting, even in constructions with a very large number of screening positions, a very shallow first accept stock chamber and therefore the support plate projected length of the core elements 14 into the screening aperture matrix may be held to a minimum which is important because of the strict requirements of core element placement relative to the screening aperture matrix. This construction also avoids accept stock collecting facilities external to the casing as would interfere with the mechanical drive facilities.

In the design of FIGS. 2, 3 and 4 these accept stock transmitting, second flushing flow chamber travering tubes 82 are shown of integral construction with core element support plate 74 and the compensatory plate 78. The accept stock central fluid communicating passageways through the tubes 82 are shown typically at 85.

In the foregoing it is indicated that it is desired that oscillatory motions be generated both from the raw stock side of the screening aperture matrix and from the opposed screen stock side of the screening aperture matrix. In accordance with this objective two shafts are shown, each carrying at least one eccentric "throw," i.e., a cylindrical portion with an axis displaced from, but parallel to, the axis of the shaft through its journal bearings. On the raw stock side of the screening aperture matrix the shaft is shown at 88; on the screen transmitted side of the screening aperture matrix the eccentric shaft is shown at 89. For manufacturing convenience journalling of the shaft may occur in bushing provided as at 89a, see FIG. 11. To coordinate the oscillatory motions derived from these two shafts a positive mechanical drive from one shaft to the other is provided.

The eccentric drive shaft 88 is shown provided with a V-belt pulley 90 (shown with a reduced outside diameter for convenience of representation), through which power is received from external sources. A pin 91 is mounted eccentrically in the pulley 90 for driving a connecting rod 92. Near the other end of the connecting rod a journal bearing is provided on a pin 93 eccentrically positioned from the shaft 89 axis with a radial displacement equal to the pin 91 displacement from the shaft 88 axis in an arm 94 attached to the shaft 89.

A similar connecting rod drive is shown at the opposite ends of the shafts 88 and 89 with the substitution of an arm 94 for a pulley 90, but displaced in angular position or timing from the connecting rod drive previously described so that a continuous drive of the shaft 89 is assured despite a possible drive failure by either individual driven when in a "dead center" position.

The pulley 90 and the arms 94 are shown retained to their shafts by keys 95 and set screws 96; the connecting rods 92 are retained on their pins by cotter pins 97 over washers 98.

For the derivation of an oscillatory motion an eccentric follower link 99 is shown closely but freely mounted on the eccentric throw, A, formed on the eccentric shaft 88 on the raw stock side of the screening aperture matrix; the opposed end of the eccentric follower link 99 is shown extended into a tube 100 axially positioned in and integral with the casing end member 24 where the follower link is shown closely, oscillably rotationally positioned on a wrist pin 101 fitted in the yoked end of a diaphragm stem 102 slidably positioned within the tube 100. The stem 102 is shown formed integral with the raw stock chamber closure plate or diaphragm 58. Screws 103 retain the flow control plate 62 to a hub protrusion of the raw stock chamber closure plate 58 and render it oscillable with the said plate 58.

On the screened pulp side of the screening aperture matrix, on the second eccentric drive shaft 89, adjacent the screen unit axial position, an eccentric follower link 104 is closely but freely positioned on an eccentric throw B on said eccentric shaft 89 with the opposed end of the link 104 apertured to be oscillably rotatable on a wrist pin 105 fitted in the end as yoked to receive the link 104 of a screening aperture matrix stem 106 that is guided for vertical oscillation. The screening aperture matrix is shown retained on the stem 106 with the slotted nut 107. A screening aperture matrix oscillating motion is thus made possible.

The second eccentric drive shaft 89 provides an oscillable motion for the core element support plate 74 and the second flushing flow chamber volume compensatory plate 78. A pair of eccentric drive links 108L and 108S are shown closely but freely positioned on the eccentric throws shown at C and c, respectively, on the eccentric shaft 89; the opposed end of each said link is shown apertured as to be oscillably rotatable on a wrist pin 109 fitted each in a yoked protrusion 110 from the oscillating accepted stock receiving trough or pod 43 that is attached to the second flushing flow volume compensatory plate 78 that is oscillating with the core element support plate 74; this oscillating structure will presently be described in greater detail. The wrist pins 109 are retained by the cotter pins as at 109a.

The core element support plate 74 and the second flushing fluid chamber volume compensatory plate or diaphragm 78 are shown joined together with a junction tube 111 and the accept stock transfer tubes 82 and this assembly shown guided for vertical oscillation by a slidable fit between the interior of said junction tube 111 and the exterior of the tube shown at 112 that is internal to and integral with the casing end member 44. The tube 112 is shown closed at the bottom of the plug 112a.

An upward extension of the junction tube 111 forms an annular lip 113 which cooperates with a downwardly protruding lip from the screening aperture matrix to keep the accepted stock in the first accepted stock chamber from flowing freely onto lubricated parts. A downward extension of the junction tube 111 is at its exterior shown in threaded engagement with the inner wall of the accept stock receiving trough 43. At its outer wall the trough 43 is attached with screws 115.

The optional flow director plates 21 for placement on the screening apertures matrix flow entry face may present edges at its outer face which are too narrow when the screening position holes are closely spaced with the result that fibers may hang over or "hairpin" on such narrow edges. This may be somewhat overcome by elevating the raw stock entry face at those places where such a narrowing of the plate material between adjacent holes occurs so that isolated, slightly rounded points with much less hairpinning hazards will appear in replacement of such narrow rounded edges. At the lower levels of such a plate face, occurring where the web between adjacent holes is thicker hole to hole, the flow entry edges may be more generously rounded. There will be rounded ridges rising towards the elevated peaks; if the ridges occurred only in opposed pairs the lower areas could be described as saddle shaped; since generally there will be three equally spaced ridges arising from a low area in what might be called a tricorn shape, the lower elevations there could be called pseudo-saddle shaped. FIG. 5 shows a broken out portion where three holes appear closely adjacent as in the flow director plate 21″. FIG. 6 is an isometric view of broken out portion of FIG. 5 formed in accordance with the foregoing where the tricorn peaks are indicated at 118 and the pseudo-saddle center at 119.

An alternative method of providing more gently rounded raw stock entry edges in the flow director plate 21 is shown in FIG. 7 at 21′, a section across a raw stock flow entry annular aperture. In this design the flushing flow tubes here indicated under the number 66′ are preferably of individual manufacture for assembly in the flow control plate, here indicated under the number 62′. The flushing flow tube 66′ is presently shown with flared periphery 120 at its flow director termination, the interior passageway 20′ being likewise outwardly flared as at 121. The holes in the flow director plate are also flared at 122; this permits a larger radius of curvature at the raw stock flow entry edges to discourage hairpinning. Since the maintenance of raw stock flow cross sectional area is of greater significance than, and no longer equivalent to, parallel raw stock flow passage walls, the outside flare of the flow director tubes in general will not precisely match the flare of the flow director plate holes. This alternate design, though more expensive, in addition to the advantage above cited has the advantage that the flushing flow tube internal flare 121 can be made to match that at the termination of the core elements. It also appears to be advantageous as regards its screen stripping removal potentialities.

To illustrate features described more fully elsewhere herein, the following features are numbered on the drawings: In FIG. 1 a typical "throat" zone at 124, the critical zone 126, the outside diameter of the flow director 17 at 127, the inside diameters of holes in the flow director plate 21 at 128, and the tapered flow entrance 129 to the screening aperture on the screening aperture matrix raw stock face.

The core element support plate 74 and the compensating plate 78 serve as diaphragm faces of the second flushing flow chamber and by their variant diameters provide for a variable second flushing flow chamber volume even though said plates are joined by the accept stock transfer tubes. However, with this design a compromising of the timing of the second flushing flow chamber volume variations and the timing of the desired core element cyclical motion is indicated. The matter is considered in greater detail hereinafter but for present purposes it may merely be noted that the whole matter is complex and the design of FIGS. 2, 3 and 4 will be adequate in most instances. However, a design to assure the severance of the timing of the core element cyclical travel and the second flushing flow chamber volume variation timing will now be considered.

Refer now to FIG. 11 which is comparable to FIG. 4 and the description previously given. In the design of FIG. 11 the core element support plate is driven in the same manner as previously described but to separate the timing of this from the timing of the second flushing fluid chamber volume variation a supplementary, separately driven, ring diaphragm of rigid material is provided to introduce a second cyclical chamber volume effect in order to adjust the timing of the cyclical second flushing fluid chamber volume variations. In the following description, when, to accommodate additional parts, small modifications are required in parts already assigned numbers, the same numbers will be used, suffixed M.

In FIG. 11, eccentric throws D and d are shown mounted for rotation in apertures in two ears 130 attached to a tubular member 131 that extends adjacently to the level of the compensating plate 78M where it has mounted to it, by means of the clamping ring element 132 and clamp screws 133 a ring diaphragm 79M of flexible material. The flexible diaphragm 79M is mounted between the casing elements, here 39M and 44M, and near its inner edge it is mounted between the clamping ring 80M and the compensatory plate 78M. It will be noted that there are two free flexing zones for the flexible diaphragm 79M because the tubular member 131 now added may be in relative oscillation both with respect to the casing wall and the compensatory plate.

It will also be noted that there are no "connecting rod" type links shown on the eccentric throws D and d as the tubular element 131 itself serves in the capacity of accommodating and substantially rejecting the horizontal components of the eccentric throws eccentric motions. As may also be seen in FIGS. 8 and 11, the tubular element 131 is cut back on one side, at 134, to clear the also oscillating stock delivery tube 46.

As noted aforesaid, the second flushing flow chamber volume compensation to effect a cyclical flow through the central passageways 18 of the core elements 14 is effected by the adjustment of the effective compensatory plate 78 diameter, acting as a diaphragm, and is therefore effected with varying degrees of remoteness from the passageways 18. In the screen unit with a small number of screening apertures, as illustrated, this circumstance is an insignificant handicap. However, in a commercial screen unit with a very large number of screening apertures corrective features may be requisite over and above the possibility of adjusting the core elements 18 in internal diameter and length as presently to be described.

It is however possible in the provision for cyclical core element passageways flows of FIG. 11 to replace the differential diaphragm diameter provisions of the foregoing with numerous small diaphragms at apertures in the compensating plate, here 78M, so that the second flushing flow chamber volume is controlled locally more closely adjacent the core elements passageways 18, as in the design of FIGS. 8 and 9 and in the broken out portion of FIG. 11. This feature is shown adapted to the present small screen unit design although this adaptation lacks the symmetry that would be possible in a very large screen unit design. It may be noted in FIG. 3 that the raw stock transfer tubes 82, with their internal passageways 85, appear in pairs, six pairs if the whole screen unit is considered. The open areas in FIG. 8 available for apertures 135 in the compensating plate 78M, for the desired small diaphragms, must be interposed between these tubes 82 on the compensating plate 78M and, since the plate 78M is also a closure for the second accepted stock chamber 42 mounted beneath it, the space available for apertures is further limited. In FIG. 8, only one typical aperture is here considered, interposed between two adjacent pairs of accepted stock transfer tubes 82.

To provide for clamping the flexible diaphragm element 136 shown in FIG. 9 adjacent the oscillable compensating plate 78M apertures to the compensating plate 78M, the clamp ring 80 is altered as at 80M to extend internally in a broad flat ring portion. This will generally be coextensive with and provided with matching diaphragm apertures 137 on the flat portion of the compensating plate 78M so that two matched opposed diaphragm clamping faces are provided. The sidewalls of the trough 43M are modified to provide space for the aforesaid clamp ring 80 broadening. Thus the diaphragm 136 as well as the clamp ring 80M will bec lamped by the trough 43M mounting.

Free flexing zones in FIGS. 8 and 9 for the small diaphragms are provided as follows: The outside boundaries of the free flexing zones of the flexible diaphragm 136 are formed by the apertures 135 in the compensating plate 78M and the matching apertures in the ring 80M. The inner boundaries of the free flexing zones are the matching peripheries of the small diaphragm centers plates 138 and the diaphragm centers clamp plates 139 which are retained to the diaphragm centers plates 138 by clamp screws 140 extending through the flexible diaphragm 136. The small diaphragm centers plates 138 are shown mounted integrally on a ring element 141. The support for the ring 141 extends through the accept stock delivery tube 46 to reach a mounting. For stationarily mounting the ring 141 the accept stock delivery tube 46 may be modified to a form 46M by cutting away the top part of the tube, reducing it to a trough shape, at its exit through the screen unit casing wall to provide entry for a bracket 142 to be mounted on a pad 143 on the casing end member 44M with the screws 144. The ring 141 is secured to the bracket 142 with screws 145.

While the feasibility of the localization of the pulsing of the second flushing flow chamber volume more closely adjacent to the individual core element central passageways is thus shown, the stationary small diaphragm centers positioned as shown do not attain the improvement in cyclical timing attainable as aforesaid by the introduction of the separately powered ring diaphragm 131 motion per FIG. 11; it would be possible to make the ring element 141 mounting the small diaphragm centers separately oscillating rather than stationary, with omission of the ring diaphragm 131 motion; this further refinement is not shown in the present drawings but appears to be readily attainable.

FIG. 10 illustrates a Scotch yoke type of eccentric follower that is used for comparative purposes herein. An eccentric throw 146 is shown on a shaft 147; the square eccentric follower block 148 is operable thereon. The follower block 148 is free to travel horizontally in the closely fitted ways 149 of a stem 150 that is guided for vertical travel in the stationary ways 151 and apart from any lost vertical motion in the horizontal ways 149 the vertical travel of the stem 150 is substantially equal to the vertical component of the motion of the eccentric axis about the presumed stationary journalling of the shaft 147 and its axis.

It is generally impractical, because of drafting limitations and because of variability of element proportions to suit operating conditions, to indicate accurately such fine dimensions as the screening aperture widths and the amounts of the eccentric "throws" which indicate in each case one-half of the full diaphragm stroke of the associated diaphragms, and their angular positions on the eccentric shafts, indicating the timing. For clarity of the drawings the screening aperture widths and the amount of the eccentric throws have generally been exaggerated. It may be here noted that in any practical case for present purposes flexible diaphragm seals are deemed adequate for sealing the oscillable diaphragm centers at their arms.

In view of these practical drafting limitations some appropriate design principles involving these finer dimensions are considered hereinafter in substantial detail.

Some basic design principles apply generally. As has been partly described in connection with the drawings, particularly FIG. 1, a typical screening orifice in accordance with this invention will be formed by and at a substantially uniform spacing of a periphery of a "core element" internally from the wall of a hole in a screening aperture matrix that encloses the core element. In its simplest and most easily fabricated form the screening apertures matrix hole and core element periphery will be circular in form and the screening aperture annular in description. One screening lip will be formed on the core element, the other on the screening aperture matrix. The screen entry flow will be pulsed to provide periods of low or reversed screen entry flow during which periods the screen retained material may be stripped and flushed away. Simultaneously the core elements will be cyclically in the act of retraction from the screening aperture matrix to assist in freeing the screen retained material, particularly when fibrous protrusions from the screen retained material may extend into the screening apertures. It is a feature of this invention that the screen retained material is flushed from the active screening zone in a direction substantially radially inwardly towards the core element axial centerline. To define a flow passageway for the flushed screen retained materials ("tailings," "reject stock" or simply the "rejects" in earlier pulp screening terminology), and to prevent direct and excessive admission of the raw unscreened stock into the rejects removal system, an individual flow director is positioned with a screen plate directed termination in spaced relationship to the core element screening lip termination and to the screening aperture matrix.

Alternative designs for the further removal of the rejects arise. For simplest would be to provide a central passageway either in the typical core element or in the flow director utilize the raw stock solely as a flushing fluid but this is not the preferred design, for the following reasons.

To minimize the use of raw stock for flushing is to more completely separate the oversize screeen retained material from good fibers in the suspension. It is therefore desirable to strip the screen retained material in as highly concentrated a pulp suspension as is possible when the screeen stripping is to be effected hydraulically but to remove the screen retained material from the casing, the reject stock must be properly fluid. It must be assumed that the screen retained material, usually fibrous in nature, will tend to flocculate or accumulate in clusters because of necessarily low basic flow removal velocity. A large number of screening positions is contemplated in commercial models; any lack of uniformity of the fluidity of the rejects from these numerous screening positions is undesirable as with the low velocities there is no great tendency to equalize the reject removal flow rates and any tendency towards hesitancy may become progressively worse though this action will be minimized by the pulsing action contemplated in this design.

It is therefore desirable to introduce a separate reject flushing fluid flow and this as closely as possible to the actual screening action. This reject flushing fluid to be introduced into the casing might conceivably be merely recirculated reject stock wherein the gain in fluidity would be that resulting from keeping the rejects in active motion, discouraging flocculation. As a practical matter new clear flushing fluid will preferably be substituted, at least in part, in such flushing fluid introduction. Because of the numerous screening positions desired for commercial models, the introduction of flushing fluid is not a simple matter.

Four separated flow duct systems must now be provided with connections to each screening zone: the raw stock distributional system, the screen transmitted stock flows collecting system, the flushing fluid introductory distributional system and the flushed reject stock collecting system. There are two sides to the screening aperture matrix and since it appears hardly feasibly to provide for three flow systems on one side of the screening aperture matrix, each screening aperture matrix side will be accommodating two flow systems. As shown, central passageways are provided both in each core element and its opposed flow director. These passageways are arbitrarily assigned to the flushing flow introductory distribution and the flushed rejects collecting systems without prejudice as to which system is to be effective in the core elements internal passageways and which in the flow directors internal passageways. This option is desirable as the flows within the actual screening zones are critical and the direction of flushing flow travel best for one set of operating conditions may not be best suited for another set of operating conditions. The flushing flow introduction to a screening zone and the flushed rejects removal therefrom is herein considered as establishing a flushing flow "circuit."

The raw stock flow is shown accommodated externally to the flow directors and the screen transmitted flow is accommodated externally to the core elements, all on their appropriate side of the screening aperture matrix.

The vector diagram, FIG. 1a, presently to be described, is directly applicable only to the basically preferred, screening aperture matrix oscillating version of FIGS. 2, 3 and 4. To illustrate the key dynamic theory of the operation of the screen of FIGS. 2, 3 and 4, in compact form, several simplifications are made in the following description. It will be noted that the diaphragm oscillatory motions are generally obtained through eccentric follower links functioning similarly to "connecting rods" of more common occurrence. For obtaining an oscillatory motion from a rotating shaft this system is generally preferred to the "Scotch yoke" system, illustrated in FIG. 10, as being more economical of construction. The approximation will be made for present purposes that the resultant oscillatory motion obtained with the two systems are equal, equivalent to the assumption that the effect of wavering in angularity from the true vertical of the connecting rod type eccentric followers hole centers alignment is negligible. As greatly simplifying the following discussion this is a reasonable first approximation inasmuch as the eccentric follower hole centers spacing is anticipated to be 40 or more times the throw eccentricity; the latter involves such small dimensions that it has been roughly exaggerated for drawing clarity as previously noted. In this connection it may be noted that any lost motion due to bearing looseness is also neglected.

For the construction of the vector diagram it may be noted that inasmuch as the two eccentric drive shafts 88 and 89 are to operate in substantial synchronism, vectors representing the angular positions and scaled magnitudes of displacements of the eccentric throw axes from the shaft axes may be applied to a single diagram without indication of which shaft upon which the eccentric throw occurs and furthermore, in view of the approximation of the preceding paragraph and assuming the screen to be in operation in the spatial orientation of the drawings, an upwardly travelling oscillatory motion may be so indicated on the vector diagram despite the apparent inversion of directions of the oscillatory motion take-off from the shaft in the case of the lower shaft.

With the approximations that have been made and with the added assumption of constant eccentric shaft speeds, a vector representation of an eccentric throw axis displacement from the shaft axis may be considered as the vectorial sum of horizontal and vertical cyclical displacements and these separated displacements will vary sinusoidally with time; since this is the case they will vary only in scaled magnitude and timing whether either the vertical or horizontal component is considered or, for that matter whether a horizontal or vertical component of a vectorial sum or difference of any two such eccentric throw vectorial representations is considered.

Under the foregoing concepts, in the rotatable vector system indicated in FIG. 1a, the vector A is a scaled representation of the magnitude of the centerline displacement relative to the shaft axis of the eccentric throw A which powers the flow control plate 62 oscillation. For reasons of simplicity as later will be apparent the vector B, a representation of the magnitude of the centerline displacement from the shaft axis of the eccentric throw B which powers the screening aperture matrix 12 oscillation is shown in FIG. 1a as leading the vector A by 90° and with a magnitude equal to that of the vector A.

The vector sum of the vectors A and B, or $(A+B)$ as bracketed in FIG. 1a, is significant for the following reasons. The vertical component of A represents, scaled, the cyclical vertical position of the flow control plate that is the outer face of the raw stock chamber. The vertical component of B represents, similarly scaled, the cyclical vertical position of the screening aperture matrix, which either alone or with its superimposed flow director plate, if used, constitutes the second or inner face of the raw stock chamber. Note that both faces have substantially the same diameter when measured as diaphragms normal to the oscillation direction. The vertical component of the vector sum of A and B therefore quite closely represents twice the average or mean position of the chamber fluid contents vertically relative to the position it would assume if both eccentric throws were reduced to zero. Mathematically this twice vertical height, as indicated in the foregoing, a sinusoidal function of time.

It is desired to mathematically differentiate this function with respect to time, according to the methods of differential or infinitesimal calculus, to obtain the timing and magnitude of the cyclical acceleration force prevailing in the raw stock chamber at any time in the cycle. It is presumed possible to differentiate the vector $(A+B)$ by direct vectorial means to obtain first the velocity vector $(A+B)'$ and by a second differentiation the acceleration vector $(A+B)''$, both indicated as regards timing in FIG. 1a. The equivalent and more familiar process of separating the horizontal and vertical components and representing them by simple sine and cosine fuctions and differetiating them algebraically to obtain the components of the velocity and acceleration vectors produces the same result. Inasmuch as only the timing is presently of interest, the magnitude of these derived vectors, as would in any event require adjustment to some new scale because different physical units are involved, have not been scaled in the representation of these derived resultant vectors in FIG. 1a. In this simplified case, with the assignment of simple sine and cosine functions to the horizontal and vertical components of the initial position vector $(A+B)$ the velocity vector appears 90° in advance of, and the acceleration vector 180° in advance of, the position vector $(A+B)$, a fact that is no doubt well known for this simple case.

It is a matter of common experience that, in common parlance, when fluid is rotational within a confining chamber, the rotating fluid will exert a centrifugal force on the confining walls. While such a rotational chamber has no counterpart in the present designs, it is worthy of note that from the mathematical viewpoint it is the equal and opposed force of the chamber walls on the fluid that maintains the centripetal acceleration of the material fluid particles.

From these considerations it is apparent that the centrifugal force of common concept is opposed to the direction of the fluid acceleration and in the vector diagram of FIG. 1a the opposed direction of the acceleration vector $(A+B)''$ would be the direction of the centrifugal force of the fluid on the chamber wall which would be, in the vector diagram of FIG. 1a in the same direction as the original position vector $(A+B)$.

For the practical purposes of the present disclosure it is only the vertical components of the force vector that has significance, being in fact indicative of the fluid inertial pressure exerted against particular chamber faces. It is also a matter of common experience that, in the case of a reversal in the motion of a chamber confining fluid by the application of an acceleration in the direction opposed to the original motion, the inertial force of the confined fluid on a chamber wall will be in the original travel direction and again in this instance opposed to the direction of acceleration. This relates to the case at hand; when the oscillable chamber mean level is in a most upward position a pressure will be directed upwardly as is useful for neutralizing the raw stock supply pressure for temporary suppression of screen slot throughput for screen flushing. The vertical component of the vector $(A+B)$ represents more precisely the timing of this alternating screen flow suppressing and assisting inertially induced pressure. In this rough analysis the localized fluid acceleration into the screening orifices, as in relatively small zones, is ignored for present purposes.

Since the screen flow is generally streamline, subcritical, it is substantially proportionate to the pressure, as occurs commonly with fine orifices. The screen flow therefore may be considered as the sum of two flows, one due to the inertially induced screening pressure, timed with the vertical component of the vector $(A+B)$ but read positively in the vertically downward direction, and a steady flow due to the raw stock supply pressure. The flow summation is "algebraic" that is, the cyclical negative values of the flow attributable to the inertially induced pressure tends to neutralize the screen flow attributable to the raw stock supply pressure.

Neglecting for the present side effects at a chamber cylindrical wall that is not oscillating, either chamber oscillation acceleration is unidirectional except as cyclically reversible in direction and therefore its effects are comparable to gravitational acceleration which is also unidirectional. Inertial head will be generated in the confined fluid in the cyclical forward and reverse directions of oscillation acceleration. It appears obvious that if all the walls of a chamber were rigid and oscillating as a unit all chamber openings, assumed presently to be infinitely small, occurring commonly in a plane perpendicular to the direction of oscillation will be at equal inertial heads at any one time in the oscillation cycle.

It is desirable that the raw stock chamber shall contract in volume cyclically as the raw stock is forced into the screening apertures cyclically so that energy will not be unnecessarily wasted in pulses back into the raw stock supply piping. Since the screening aperture matrix, with or without a superimposed flow director plate, and its mounting ring is shown with an outside radius substantially matching that of the flow control plate, measured from the vertical oscillatory axis, it will be seen that the cyclical change in raw stock chamber volume from the average or mean value will be substantially proportional to the change in vertical position of the flow control plate less the change in vertical position of the screen plate (or in other words proportional to the vertical component of A less the vertical component of B or the vertical component of $(A-B)$ vectorially), the vector components and the change in chamber volume from the mean value indication to be read positively in the vertically upward direction.

It will be seen by rotating the vector system of FIG. 1a so that the vector $(A+B)$ is in its most downward position and representative of the maximum screening pressure position, the vector $(A-B)$ will be decending indicating a contraction of the vertical component of the vector $(A-B)$. Furthermore, mathematically this will be at the maximum rate, indicating that the raw stock chamber volume change rate is at a maximum negative (contracting) value, as is proper. It was to obtain this desirable relationship in a relatively simple manner, for demonstration purposes, that the vector B was made equal in magnitude to the vector A. It should be apparent that there exists considerable latitude in adjustment possibilities for compensating for factors presently ignored and for reproportioning and retiming B against A as may be more efficient. As aforesaid the raw stock casing supply pressure may be adjusted to substantially equalize or neutralize the inertially induced screening pressure at the time of screen stripping; it is obvious that the raw stock supply pressure may also be alternatively so adjusted that the net screening flow is reversed somewhat or merely reduced as well as ceased precisely during the screen stripping operation.

It is desirable that there be only a small controlled flow in the critical throat zone 124, see FIG. 1, between the individual flow director 16 near its termination, and the screening aperture 15 and its adjacent surfaces on the core element 14 and the screening aperture matrix 12. For this purpose the flushing fluid port 28 of the first flushing fluid chamber 26 is positioned at substantially the same elevation above the screening aperture matrix as is the raw stock port 32 into the raw stock chamber 30 so that the inertially induced pressure at the screening aperture matrix level will be substantially the same, in this first analysis and, if the flushing flow pressure is adjusted to that of the raw stock supply, flow in the critical throat zone 124 will be inhibited to desired rates by pressure neutralization, in accordance with principles given above.

As compared to the raw stock chamber, the volumetric considerations of the first flushing flow chamber 26 are relatively simple. In a first analysis, and as indicated in the drawings, the effective diameter of the first flushing flow closure plate 58 and that of the flow control plate 62 are to be considered as being nearly equal; this implies that the first flushing flow chamber will operate rather as a pod of constant volume and the steady circulating flushing flow through the port 28 will be reflected in nearly steady flow through the flushing flow tubes 66 that extend through the flow control plate 62. In order to equalize the flow through the numerous flushing flow tubes they are to be made of nearly equal length and with internal passageways 20 of nearly equal diameter. Some adjustment of these dimensions may be made to compensate for the varying flow lengths and resistances between the various passageways 20 and the first flushing flow chamber port 28.

As likewise exposed to the raw stock chamber through the throat zones 124, it would be desirable to inertially balance the raw stock pressure through the second flushing flow chamber 38 in the manner outlined for the flow through the first flushing flow chamber 26. This is not practical for reasons that will be set forth presently.

When either a flushing flow tube 66 or the opposed core element 14 is cyclically in retraction from the screening aperture matrix a suction will be created in the zone 126 interposed between them; this effect is definitely too great to be wholly used for removing the screen strippings and flushing fluid must be ejected either through the core element 14 or the flushing tube 66 internal passageways to compensate for this suction action and retain control of the flow conditions in the critical throat zone 124. However, any such compensating flow will be severely destructive of any inertia balancing of the raw stock pressure. The present embodiments permit the replacement fluid to be supplied solely through the central passageways 18 of the core elements 14 and none through the central passageways 20 of the flushing flow tubes 66 to retain the aforementioned inertial pressure balancing through the raw stock and first flushing flow chambers. Under these conditions it is impractical to balance the cyclical raw stock pressure through the second flushing fluid chamber by simple inertial means and a strong pulse will tend to be transmitted through the second flushing fluid chamber port 40 into the connected piping 41. This pulse must be blocked; either a long, high impedance pipe 41 may be used or preferably, a constant flow rate pump may be connected by a short pipe 41 to block the pulsed flow.

A problem regarding timing arises. In the design of FIGS. 2, 3 and 4 only a compromise solution is effected, as presently will be apparent. The core element fluid ejection flow pattern presently to be described is to be considered as superimposed upon a basically steady circulatory flushing flow through the flushing flow tubes 66 and the core elements 14 but established externally to the casing. The casing outlet flushing flow will of course be increased over the casing inlet flushing flow by the addition of the flushed screen strippings; the adjustment for this relatively small flow will be considered later herein.

The core element support plate 74 and the compensating plate 78 are shown as of one piece construction oscillated synchronously by the eccentric throws C and c. Inasmuch as the compensating plate is shown of smaller diameter than the core element support plate, when the core elements on the assembled plates are being retracted from the screening aperture matrix the second flushing fluid chamber will be contracted and inasmuch as the pulse into the chamber port 40 will be impeded as aforesaid, fluid may be ejected through the central passageways 18 of the core elements 14. The retraction of the core elements should be synchronous with the flushing fluid tube retraction, since the also synchronous flushing fluid ejection must compensate for the flushing fluid tube retraction suction as well. Vectorially, as per FIG. 1a, the two opposed plate motions also appear in apposition; C, representing the core elements driving eccentric throws C and c eccentric axis displacement is diametrically opposed to A, representing the flow control plate driving throw eccentricity. By rotating the diagram, FIG. 1a, it is apparent that the maximum core retraction (downward in the drawings), will be attained some 45 degrees after the screen flow minimizing, or reversal, extreme. This timing is appropriate since the core element retraction should continue with the screen stripping flow which should extend until the screening process resumes.

Nevertheless, despite the good timing match indicated in this rough first analysis, it does appear that a more flexible solution to this timing problem, involving the substantial severance of the timing of the core element cyclical motion for mechanical retained fiber freeing from the timing of the compensating flushing fluid ejection through the central passageways of the core elements, should be provided for. This may be accomplished by the variant design of FIG. 11, comparable to FIG. 4 of the basic design; in said FIG. 11 a diaphragm element 131 of rigid material is indicated as operable on the second flushing fluid chamber volume. The diaphragm element 131 is shown separately powered by additional eccentric throws D and d on the eccentric shaft 89M and therefore may be timed as desired for adjustment of the cyclical second flushing fluid chamber volumetric effects of the core element support plate and the compensatory plate acting as diaphragm centers and the possible separation of the core element motion timing from the flushing fluid ejection timing is achieved.

The cyclical stripping and flushing through the throat zones 124 of the released screen retained material will now be described. This flow should be made as small as possible to disturb as little as possible the screen entry flow and for the same reason should be effective when the screen flow is cyclically minimized or reversed. The flushing flow should be comprised of a steady flow rate with a cyclical flow superimposed upon it. The steady flow rate is readily obtained by adjustment of the screen unit input and output flushing flows as occur nominally at steady flow rates; the cyclical flushing flow must be considered in more detail. Inasmuch as a cyclical volumetric suction must be created in the zones 126 between the flushing flow tubes 66 and the core elements 14, this matter is clearly related to the core element cyclical flushing fluid "ejection" above considered and the following amounts to a reconsideration of the foregoing matter in the light of some added requirements. Reconsidering the matter of the timing of such fluid "ejection," it will be seen that when the vector system of FIG. 1a is rotated so that the vector $(A+B)$ is vertically upward, previously indicated as the time for minimal, ceased or reversed screen flow, the vertical component of the vector C and therefore the second flushing flow chamber diaphragm assembly of the drawings are indicated as travelling downward, resulting as aforesaid in relative flushing fluid ejection upward from the core elements central passageways; if this relative ejection is insufficient for space replacement a volumetric suction in the zones 126 will occur resulting in rejects removal through the throat zones 124.

In the simpler case this reduced relative flushing fluid ejection might be obtained merely be reducing the amount of the difference in diameters between the core element support plate and the compensatory plate; with this the timing may prove generally satisfactory in many years.

In the case where the supplementary diaphragm 131 of FIG. 11 is available more satisfactory timing of the relative flushing fluid ejection is possible through adjustment of the timing of the cyclical volumetric changes in the second flushing fluid chamber by means of this supplementary diaphragm.

The alternative design details of FIGS. 5, 6 and 7, as described in the drawing description, represent possible alternate constructions of the flushing flow tubes and the flow director plate more suitable for commercial screens where close spacing of the screening positions is an indicated object, in order that a maximum number of screening positions may be accommodated in the least possible space.

It is to be understood that it appears that the screen unit may be adapted for a "pressurized" operation, in the terminology of the trade, that is to say, all the working pressures may be adjusted to suit some one pressure or head level at the desired screen operation location as, for example, to suit some established raw stock hydraulic head; for the present designs this will involve maintaining a pressure controlled pneumatic cushion in the first accept stock chamber through piping as may be attached to the present vents for this chamber.

It is conceivable to operate a screen of these designs in spatial orientations other than that selected for drawing purposes but alternate provisions against mutual contamination of pulp and lubricant may have to be made and relocation of the first accepted stock chamber vents may be necessary.

It is deemed preferable to include a flow director plate such as at either 21, 21' or 21" in the drawings. The advantages of individual prescreening flow passageways to certain required characteristics is set forth in my U.S. Patent No. 3,276,584, issued Oct. 4, 1966.

I claim:

1. Within a casing open to external connections to its generally enclosed chambers a pulp screen comprising a screening aperture matrix between unscreened and screened stock chambers and having at least one hole therein forming a screening aperture outer wall, a core element in any said hole, said hole and core element having a size and shape and supported to form a continuous closing screening aperture of substantially uniform width between the internal wall of the hole and the periphery of the core spaced from said wall, and internal passageway through said core element for a flushing flow for flushing an unscreened stock flow occasionally diverted from entering said screening aperture in order to carry screen rejected material carried by said flushing flows to a reject chamber, an individual flow director positioned in said unscreened stock chamber and opposed to said screening aperture to form a throat zone open to said unscreened stock chamber, said flow director preventing unnecessary excess flow of unscreened stock into said flushing flows while guiding flushing flow of screen retained material over the screening lip of said core element toward the axis of said core element.

2. Apparatus according to claim 1 in which the side of said screening aperture matrix exposed to said unscreened stock chamber has a tapered wall around and converging toward said aperture.

3. Apparatus according to claim 2 and including a wall surrounding said flow director and spaced therefrom to form between said wall and said flow director a channel for guiding flow of stock from said raw stock chamber by said wall to said aperture.

4. Apparatus according to claim 3 in which said wall is the interior surface of a hole in a plate removably secured against said screening aperture matrix with said flow director projecting into said hole.

5. Apparatus according to claim 1 in which said reject passageway is provided by an internal passageway through said flow director.

6. Apparatus according to claim 1 in which said core and said flow director each have internal passageways to permit flushing fluid flow between said passageways.

7. Apparatus according to claim 1 and including means for supporting said core for relative motion transverse to said screening aperture matrix while maintaining the substantially uniform width of said screening aperture, said relative motion withdrawing said core into the hole in said screening aperture matrix far enough to place the end of said core below the surface of said screening aperture matrix.

8. Apparatus according to claim 7 in which said screening aperture matrix has a plurality of holes with a corresponding plurality of cores and individual flow directors associated therewith, said plurality of cores being supported on a common core support plate and said individual flow directors being supported on a common flow director support plate.

9. Apparatus according to claim 8 and including a generally cylindrical wall casing separated into said screened and unscreened stock chambers by said screening aperture matrix sealed at its periphery to the inner wall of said casing, a peripheral flexible diaphragm sealing said flow director support plate in axially movable relation to said inner wall on one side of said screening aperture matrix to form an outer wall of said unscreened stock chamber, an inlet conduit for said unscreened stock chamber, a peripheral flexible diaphragm sealing said core support plate in axially movable relation to said inner wall on the other side of said screening aperture matrix to form an outer wall of said screened stock chamber and an outlet for said screened stock chamber.

10. Apparatus according to claim 9 and including a peripheral flexible diaphragm sealing said screening aperture matrix to said inner wall, means for oscillating said screening aperture matrix and said flow director support plate relative to said casing and relative to each other whereby the unscreened stock chamber confined between said screening aperture matrix and said flow director support plate oscillates in said casing and the volume of said unscreened stock chamber periodically contracts.

11. Apparatus according to claim 9 in which said flow director support plate is supported obliquely with respect to the axis of said casing with the spacing between said screening aperture matrix and said flow director support plate maximal adjacent said inlet conduit and minimal substantially diametrically opposite said conduit.

12. Apparatus according to claim 9 and including a flushing fluid chamber comprising an extension of said casing, a closure plate supported for axial motion relative to said casing and sealed at its periphery to the inner wall of said extension, said extension having a port therein to connect with a flushing fluid conduit external to said casing.

13. Apparatus according to claim 12 in which said extension projects axially beyond the position at which said flow director support plate is sealed to said casing to form said flushing fluid chamber between said flow director support plate and said closure plate and said reject passageways are provided by an internal passageway through each of said flow directors.

14. Apparatus according to claim 12 in which said extension projects axially beyond the position at which said core support plate is sealed to said casing to form said flushing fluid chamber between said core support plate and said closure plate and said reject passageways are provided by an internal passageway through each of said cores.

15. Apparatus according to claim 9 and including a pair of flushing fluid chambers comprising axial extensions of said casing projecting respectively beyond said flow director support plate and said core support plate, and a pair of chamber closure plates supported for axial motion relative to said casing and peripherally sealed to the inner walls of said extensions respectively.

16. Apparatus according to claim 12 in which said extension has a reduced internal diameter relative to the internal diameter of said casing and said closure plate supported within said extension and produces a differential volume change in said flushing fluid chamber for equal axial motions of said closure plate and the adjacent axially movable plate in said casing.

17. Apparatus according to claim 14 in which said core support plate and said closure plate are rigidly joined together by a plurality of tubes each having an axial passageway extending through both of said plates to place said screened stock chamber in communication with a second screened stock chamber formed below said closure plate.

18. Apparatus according to claim 17 in which said second screened stock chamber is a pod attached to the under side of said closure plate and axially movable therewith.

19. Apparatus according to claim 17 in which said closure plate is sealed to said inner wall by a flexible diaphragm and including a rigid ring attached to said diaphragm between and spaced from the periphery of said closure plate and said inner wall, and means for oscillating said ring element independently of oscillation of said closure plate to provide cyclical changes in the volume of said flushing fluid chamber.

20. Apparatus according to claim 17 in which said cores have axial passageways to provide said reject passageways and said closure plates has a plurality of openings therein opposed to the passageways in said cores and including individual diaphragm plates movably supported in said openings on peripheral flexible diaphragms which seal said diaphragm plates in said openings.

21. Apparatus according to claim 20 in which said diaphragm plates are supported in fixed relation to said second screened stock chamber.

References Cited

UNITED STATES PATENTS

| | | | |
|---|---|---|---|
| 348,128 | 8/1886 | Keeney | 209—384 X |
| 947,125 | 1/1910 | Reynolds | 209—273 |
| 1,185,794 | 6/1916 | Maug | 209—270 |
| 2,301,514 | 11/1942 | Brewster | 209—397 |
| 3,276,584 | 10/1966 | Mathewson | 209—397 X |

HARRY B. THORNTON, Primary Examiner

ROBERT HALPER, Assistant Examiner

U.S. Cl. X.R.

209—269, 380, 399

PO-1050
(5/69)

UNITED STATES PATENT OFFICE
CERTIFICATE OF CORRECTION

Patent No. 3,489,282      Dated January 13, 1970

Inventor(s) Wilfred F. Mathewson

It is certified that error appears in the above-identified patent and that said Letters Patent are hereby corrected as shown below:

Column 1, line 62, the word "screen" should be -- screening --.
Column 3, line 12, the word "type" should be inserted after the word -- yoke --.
Column 6, line 36, the word "travering" should be spelled -- traversing --;
    line 44, the word "screen" should be -- screened --.
Column 9, line 69, the words "bec lamped" should appear as -- be clamped --.
Column 10, line 53, the word "arm" should be deleted and -- rims -- be inserted therefor;
    line 65, the carry over word "apertures" should be -- aperture --.
Column 11, line 15, the word "For" should be -- The --;
    line 17, the word -- and -- should be inserted after the word "director";
    line 25, the word "screeen" should read -- screen --.
Column 13, line 24, the word "differetiating" should read -- differentiating --.

Column 16, line 73, delete "years" and insert -- cases -- therefor.
In the references cited, delete "Maug" and insert therefor -- Haug --.

SIGNED AND SEALED
JUL 7 1970

(SEAL)
Attest:

Edward M. Fletcher, Jr.
Attesting Officer

WILLIAM E. SCHUYLER, JR.
Commissioner of Patents